United States Patent [19]

Mawhinney et al.

[11] Patent Number: 5,053,775
[45] Date of Patent: Oct. 1, 1991

[54] DEVICE FOR DETERMINGING THE PROFILE OF THE LOADING SURFACE OF A SHAFT FURNACE

[75] Inventors: Daniel D. Mawhinney, Livingston, N.J.; Emile Lonardi, Bascharage, Luxembourg; Emile Breden, Godbrange, Luxembourg; Jeannot Loutsch, Howald, Luxembourg

[73] Assignee: Paul Wurth S.A., Luxembourg

[21] Appl. No.: 579,855

[22] Filed: Sep. 6, 1990

[30] Foreign Application Priority Data

Sep. 7, 1989 [LU] Luxembourg .......................... 87579

[51] Int. Cl.⁵ .......................... G01S 13/34; G01S 7/40
[52] U.S. Cl. ..................................... 342/124; 342/174
[58] Field of Search ................................ 342/124, 174

[56] References Cited

U.S. PATENT DOCUMENTS 2,554,100 3/1951 Miller ................................... 342/124
3,048,838 8/1962 Bretscher .......................... 342/174 X
4,737,791 4/1988 Jean et al. ............................. 342/124

Primary Examiner—Gilberto Barron, Jr.
Attorney, Agent, or Firm—Fishman, Dionne & Cantor

[57] ABSTRACT

The device includes a radar antenna mounted at the inside end of an arm which can be horizontally inserted through the wall of the furnace above the loading surface, an electronic control and measuring unit placed outside the furnace, and one or two waveguides connecting the said antenna to the electronic unit through the arm. The waveguide or waveguides are duplicated by two reference waveguides of the same nature and of the same length but not connected to the said antenna systems in order to provide a forward and return path for a reference signal generated by the electronic unit and which remains correlated with the measurment signal to allow a better identification of the reflected signal.

5 Claims, 4 Drawing Sheets

DEVICE FOR DETERMINGING THE PROFILE OF THE LOADING SURFACE OF A SHAFT FURNACE

TECHNICAL FIELD

The present invention relates to a device for determining the profile of the loading surface of a shaft furnace.

BACKGROUND OF THE INVENTION

A device for determining the loading surface of a shaft furnace using a radar probe is described in the document EP-A1-0,291,757. In this type of device it is recommended to dispose the electronic signal transmitting and receiving circuits outside the furnace in order to shield them from the severe conditions prevailing inside. At the same time, it is necessary to provide antennas inside the furnace in order to view the loading surface directly. It is therefore necessary to provide, one or two transmission lines to connect the electronic radar circuits to the antennas. At the high microwave frequencies which are necessary in order to obtain a very narrow beam from the antenna of limited dimensions, the losses associated with the transmission lines must be reduced as much as possible. This is the reason why waveguides are generally used as transmission lines since these guides have lower losses at high frequencies than coaxial cables which can also contain dielectric materials which are not suitable for the high temperatures inside a shaft frequency.

However, the use of relatively long waveguides, which must represent the major portion of the distance between the electronic circuits and the antennas, can cause measurement problems or can be at the origin of error sources. These problems derive, on the one hand, from thermal expansions, and from distortions and flexions of the arm of the probe which is cantilevered above the loading surface and, on the other hand, from the electromagnetic propagation effect more generally known as frequency dispersion and which is produced as a consequence of variations in the speed of the signal in the waveguide as a function of frequency. It is necessary to recall that the identification of the signal reflected by the loading surface is carried out, in the electronic circuit outside the furnace, by comparison with a reference signal generated by this electronic circuit. Now, if the signal undergoes modifications in the transmission line, whether in the forward or return direction, the reflected signal is difficult to identify because it is no longer correlated with the reference signal and there is risk of measurement error or of generating a false measurement signal. This problem arises both for monostatic antennas which have only one antenna serving as a transmitter and a receiver and only one waveguide for for the transmitted and the reflected signals, and for bistatic antennas, i.e., the system when has a transmitting antenna and a separate receiving antenna, each associated with a separate waveguide.

SUMMARY OF THE INVENTION

The object of the present invention is to provide a new device for detecting the profile of the loading surface of a shaft furnace using a radar probe which makes it possible to eliminate the problems caused by the relatively long waveguides between the antenna or antennas and the electronic circuits.

In order to achieve this objective, the device proposed by the present invention is essentially characterized in that the waveguide or waveguides are duplicated by two reference waveguides of the same nature and of the same length but not connected to the said antenna system in order to provide a forward and return path for a reference signal generated by the electronic unit. This arrangement can be applied both to monostatic and to bistatic antennas.

In other words, the reference signal is made to travel the same path in a waveguide as the measurement signal in order that it may undergo the same modifications as the latter such that the reference signal and the measurement signal remain correlated in order to allow a better identification of the reflected signal.

BRIEF DESCRIPTION OF THE DRAWINGS

Other features and characteristics will emerge from the detailed description of an advantageous embodiment described below by way of illustration and with reference to the appended drawings in which.

DETAILED DESCRIPTION OF THE INVENTION

Figure 1:
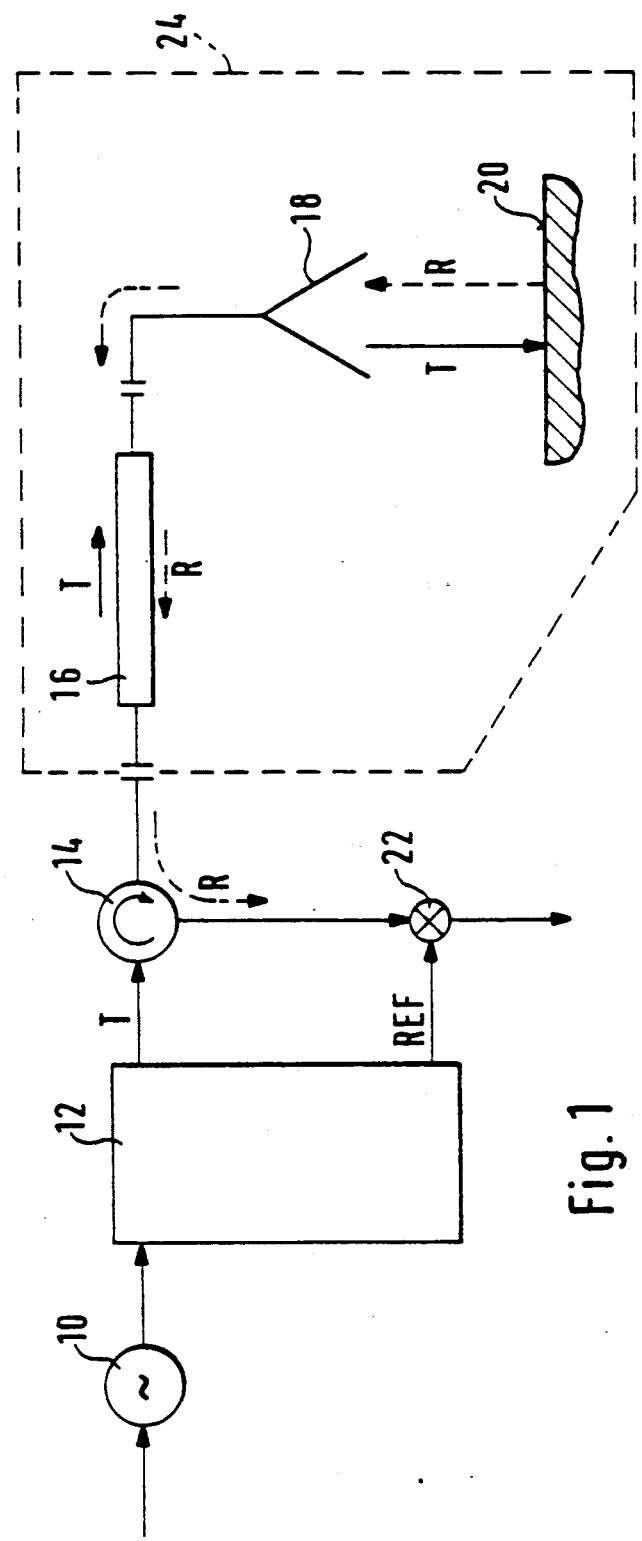
FIG. 1 is a block diagram of a known probe with a monostatic antenna.

The probe shown in FIG. 1 comprises a high frequency oscillator 10 which is controlled, in a manner which is known per se, by a modulator in order to generate a frequency-modulated signal. This signal is divided in a divider 12 into a transmitted signal T and a reference signal REF. The signal T is transmitted through a circulator 14 and a waveguide 16 to a monostatic antenna 18 which transmits a modulated microwave beam T towards the surface 20 whose distance is to be measured and which picks up the signals R reflected by this surface. The waveguide 16 and the antenna 18 are inside a shaft furnace represented by the dashed lines 24. The reflected signal R thus picked up by the antenna 18 is transmitted back through the waveguide 16 to the circulator 14 which is a kind of electronic switch for switching the signal R towards a mixer 22. In this mixer 22 the reflected signal R is identified by comparison with the reference signal and is then sent to a data processing unit for computing, in a manner which is known per se, the height between the antenna 18 and the reflection surface 20.

The monostatic system according to FIG. 1 which comprises only one signal antenna serving as a transmitting antenna and a receiving antenna is typically used when the measurement distances are relatively short.

Figure 2:
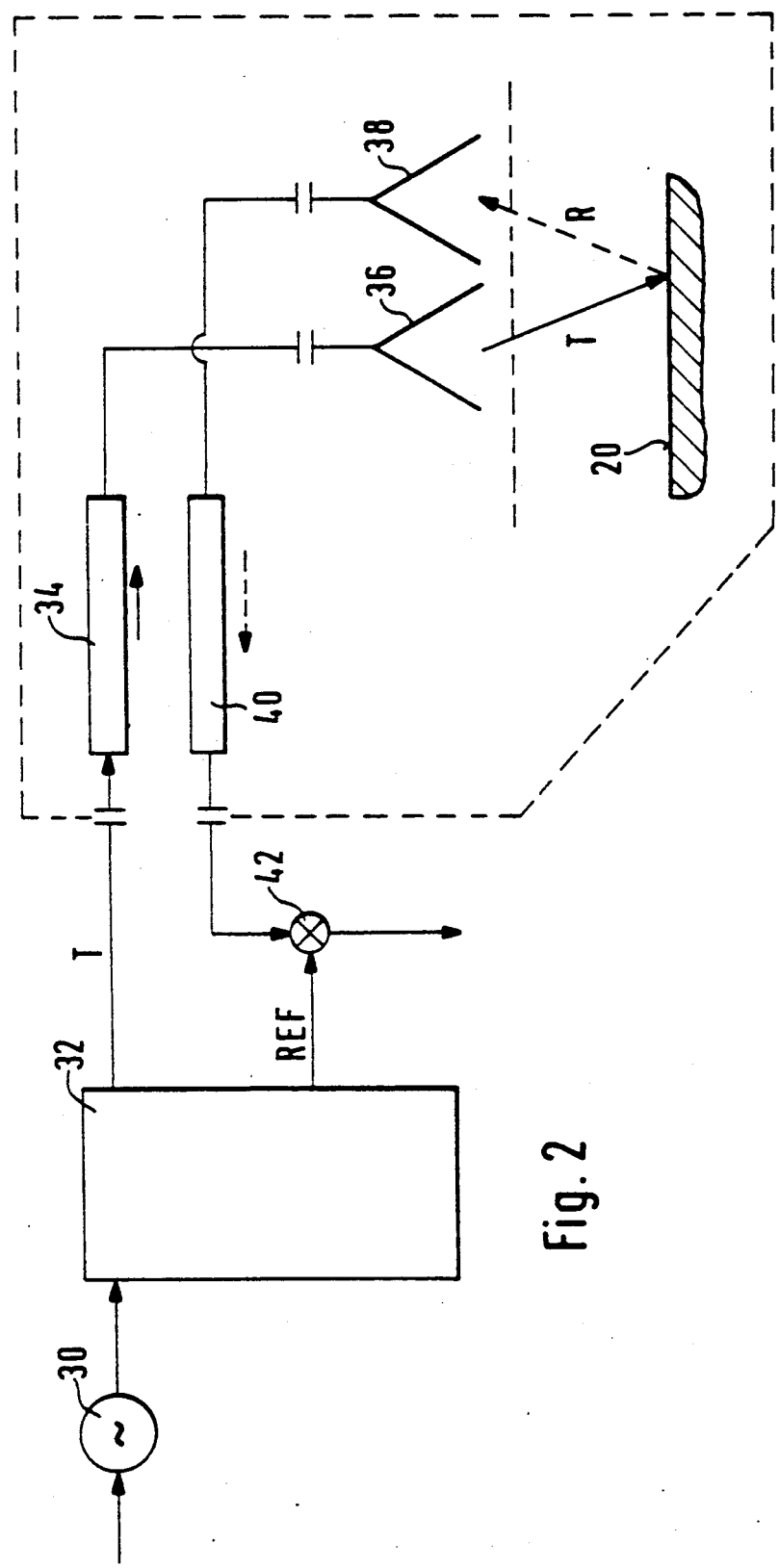
FIG. 2 is a block diagram of a known probe with a bistatic antenna.

FIG. 2 shows a bistatic system with two separate antennas, one for transmitting microwaves and the other for receiving reflected waves. This system is typically used when the measurement distances are relatively long.

In the bistatic system a frequency-modulated signal is also generated by a high frequency oscillator 30 and separated in the divider 32 into a reference signal REF and a transmitted signal T. The latter is sent through a waveguide 34 and a transmitting antenna 36 on to the surface 20 whose distance is to be measured and the signal R reflected by the latter is Picked up by a separate receiving antenna 38. The reflected signal R is sent through a waveguide 40 and is identified in the mixer 42 by comparison with the reference signal REF before being processed in a data processing unit for computing, in a manner which is known per se, the height of the loading surface 20.

Figure 3:
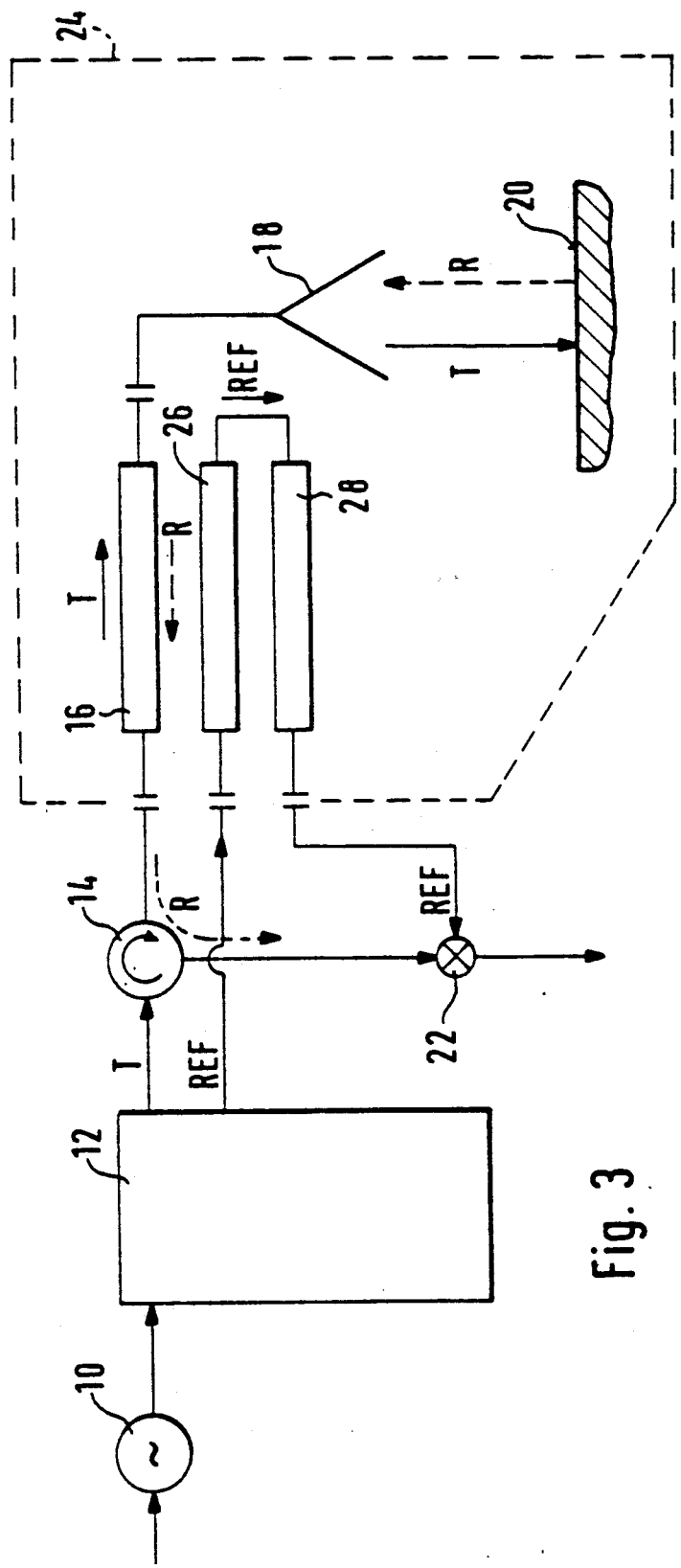
FIG. 3 is a block diagram of a probe with a monostatic antenna according to the present invention.
Figure 4:
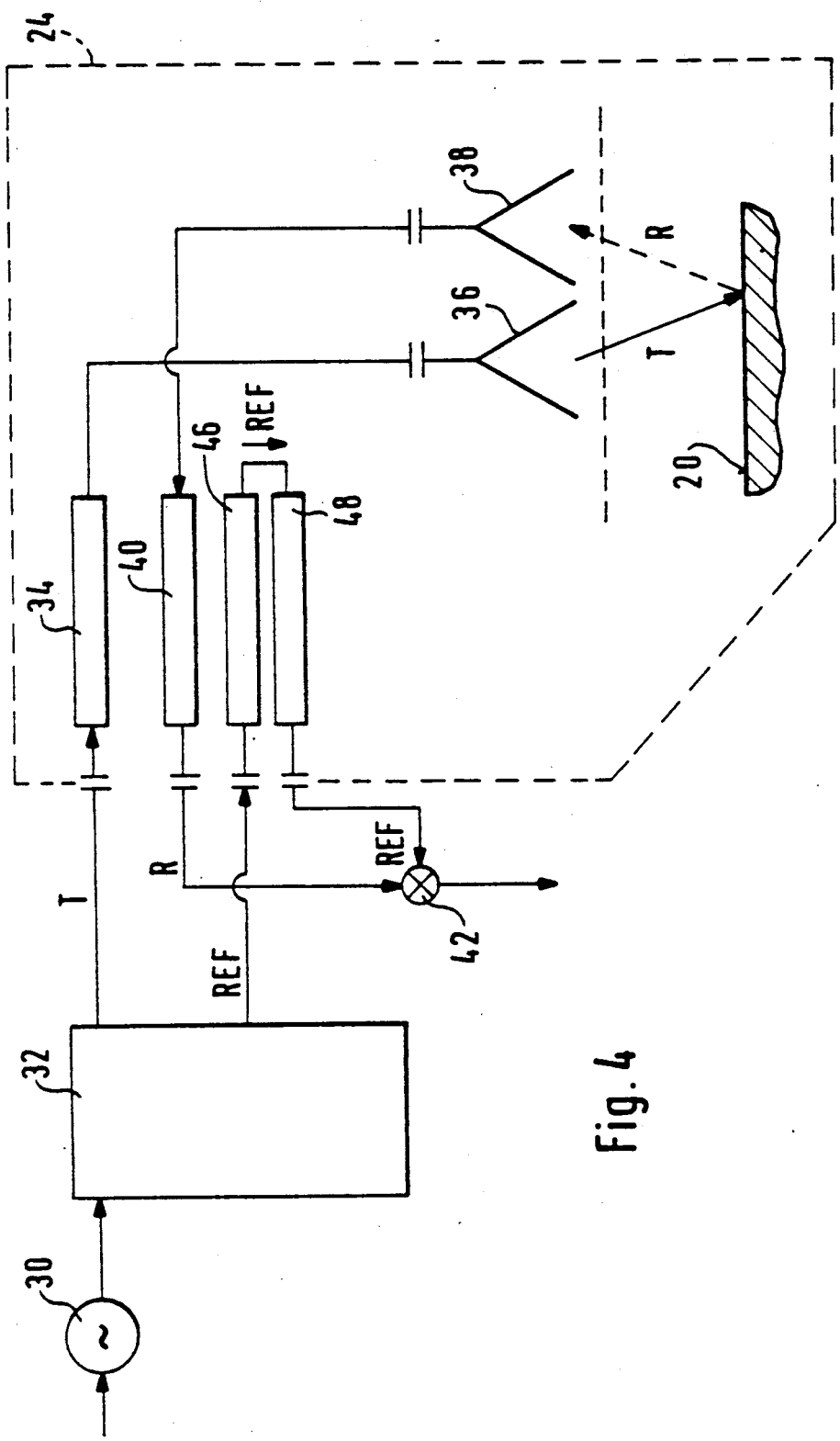
FIG. 4 is a block diagram of a bistatic probe according to the present invention.

FIGS. 3 and 4 respectively show the monostatic and bistatic measurement systems with the modifications proposed by the present invention. The components identical to those in FIGS. 1 and 2 retain the same references in FIGS. 3 and 4.

In the monostatic system according to FIG. 3 there have been added, in the support arm of the antenna 18 and of the waveguide 16, two additional waveguides 26 and 28, each being, from all points of view, particularly with regard to length and nature, identical to the waveguide 16. These two waveguides 26 communicate with each other inside the furnace, while one of the waveguides, for example, the waveguide 26, is connected to the divider 12 in order to receive the reference signal REF, while the other waveguide 28 is connnected to the mixer 22. The reference signal REF consequently travels firstly through the waveguide 26 and returns through the waveguide 28 to the mixer 22 in order to serve as a basis of comparison for the purpose, of identification of the reflected signal R. In other words, before being used for comparison, the reference signal REF travels through the same waveguide path as does the transmitted signal T and the reflected signal R in the waveguide 16. The reference signal REF is therefore exposed to the same influences such as, for example, electronic or mechanical distortions, thermal distortions, etc., as the transmitted and reflected signal and consequently also undergoes the same alterations. In other words, the reference signal is automatically correlated with the reflected signal due to its path through the compensating waveguides 26 and 28, which eliminates the problems of identification of the reflected signal.

With regard to the bistable mode of functioning according to FIG. 4, the situation is exactly the same as for FIG. 3, i.e., the presence of two waveguides 26 and 48 which are identical in all ways to the waveguide 34 of the transmitted signal and the waveguide 40 of the reflected signal in order to impose on the reference signal REF the same conditions as those on the transmitted signal and on the reflected signal in order to allow a better identification of the latter by an automatic correlation with the reference signal.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for determining the profile of the loading surface of a shaft furnace, said furnace including a furnace wall comprising:
    antenna means for transmitting a transmitted signal toward the loading surface and for receiving a reflected signal reflected by the loading surface;
    support means, insertable through the furnace wall, for positioning the antenna means above the loading surface;
    electronic means, disposed outside of said furnace, for providing said transmitted signal and a reference signal and for comparing said reflected signal to said reflected signal;
        said electronic means comprising signal generator means for generating a radar signal;
        divider means for dividing the radar signal into the transmitted signal and the reference signal; and
        comparator means for comparing the reflected signal to the reference signal;
    waveguide means for connecting said antenna means to said electronic means through said support means; and
    reference waveguide means, not connected to said antenna means, for providing a path for said reference signal, said reference waveguide means comprising:
        a first reference waveguide, disposed within said support means, for directing to reference signal from said divider means toward said antenna means; and
        a second reference waveguide, disposed within said support means, for directing the reference signal from the first reference waveguide to said comparator;
    wherein said reference waveguide means subjects the reference signal to conditions substantially identical to those imposed upon the transmitted signal and reflected signal by the waveguide means.

2. The device of claim 1 wherein the antenna means comprises a single transmitting and receiving antenna and said waveguide means comprises a single waveguide.

3. The device of claim 1 wherein the antenna means comprises a transmitting antenna and a separate receiving antenna and said waveguide means comprises:
    a first waveguide for directing said transmitted signal from said electronic means to said transmitting antenna; and
    a second waveguide for directing said reflected signal from said receiving antenna to said electronic means.

4. The device of claim 1, wherein the antenna means comprises a single transmitting and receiving antenna and said waveguide means comprises a single waveguide and wherein said single waveguide, said first reference waveguide and said second reference waveguide are substantially identical.

5. The device of claim 1, wherein the antenna means comprises a transmitting antenna and a separate receiving antenna and said waveguide means comprises:
    a first waveguide for directing said transmitted signal from said divider to said transmitting antenna; and
    a second wave guide for directing said reflected signal from said receiving antenna to said comparator means;
    wherein said first waveguide, said second waveguide, said first reference waveguide and second reference waveguide are substantially identical.

* * * * *

UNITED STATES PATENT AND TRADEMARK OFFICE
CERTIFICATE OF CORRECTION

PATENT NO. : 5,053,775
DATED : October 1, 1991
INVENTORS : Daniel D. Mawhinney et al.

It is certified that error appears in the above-identified patent and that said Letters Patent is hereby corrected as shown below:

Title: Delete "DETERMINGING" and insert therefor --DETERMINING--.

Col. 1, line 2: Delete "DETERMINGING" and insert therefor --DETERMINING--.

Col. 2, line 68: Delete "Picked" and insert therefor --picked--.

Signed and Sealed this

Fifth Day of July, 1994

Attest:

BRUCE LEHMAN

*Attesting Officer*     *Commissioner of Patents and Trademarks*